T. Roberts.
Knife Cleaning Machine.
Nº 99,480. Patented Feb. 1. 1870.

Witnesses;
O. E. Doolittle
Edward C. Walcss

Inventor;
Thomas Roberts
By his atty. B. W. Williams & Son

United States Patent Office.

THOMAS ROBERTS, OF LYNN, MASSACHUSETTS.

Letters Patent No. 99,480, dated February 1, 1870; antedated January 24, 1870.

IMPROVED KNIFE-CLEANING MACHINE.

The Schedule referred to in these Letters Patent and making part of the same.

*To all whom it may concern:*

Be it known that I, THOMAS ROBERTS, of Lynn, in the county of Essex, and State of Massachusetts, have invented a new and improved Machine for the Purpose of Cleaning Knives and other Cutlery; and I do hereby declare that the following is a full and exact description thereof, reference being had to the accompanying drawings, and to the letters of reference marked thereon.

Figure 2:
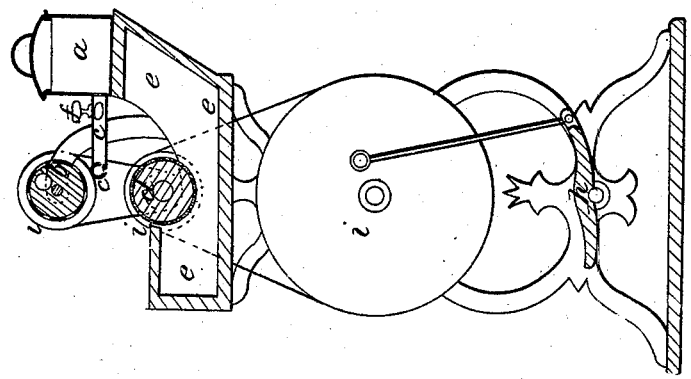
Figure 2 is a side view and section of the same.
Figure 1:
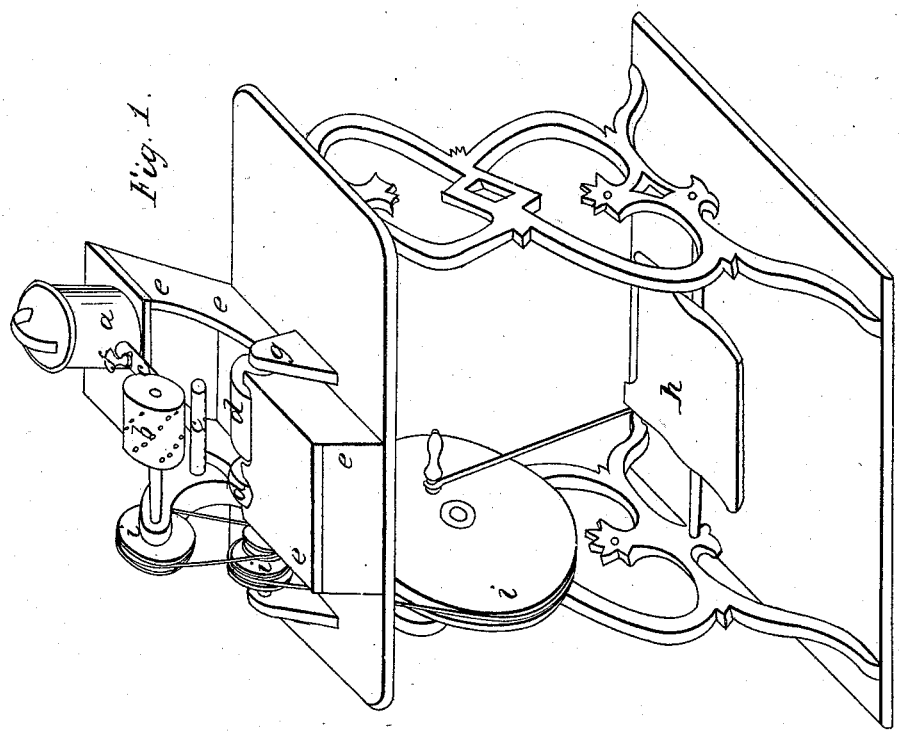
Figure 1 is a full view of my machine, in readiness for use.

$a$ is a hollow vessel, filled with water.

$c\ c$ are hollow tubes.

$f$ is a stop-cock.

$b$ is a perforated vessel, filled with brick-dust.

$d$ is a roller, usually covered with woollen fabric, upon which the knife rests.

$h$ is a common treadle, connected by a rod with the wheels $i\ i$, which are connected with the roller $d$ and the perforated vessel $b$.

In working the machine, I place my foot upon the treadle $h$, working in the ordinary way, the wheels $i\ i$ causing the perforated vessel $b$ to revolve, as also the roller $d$. Having turned the cock $f$, so as to allow the water to pass into the hollow tubes $c$, I lay the knife upon the roller $d$. The process of cleaning the knife is aided by the sprinkling of the brick-dust from the vessel $b$ and the water from the hollow tube beneath it, $c$, which is perforated on the under side.

$e\ e\ e\ e$ is simply a box or stand, to support the apparatus.

$g$ is the standard upon which the axle of the roller $d$ rests, and in which it turns.

This machine, when properly constructed, is not only a convenience, but an ornament to any house, and takes up about as much room as an ordinary sewing-machine.

I do not claim invention in the construction or arrangement of the wheels $i$ and treadle $h$; neither do I claim invention in the construction of either of the vessels $a$, $b$, or $c$, separately and by themselves.

What I claim, as my invention and improvement, is—

The arrangement of the vessel $a$, hollow tube $c\ c$, roller $d$, and perforated vessel $b$, as combined and arranged with the frame and table, and the apparatus to give motion to the machine, as shown and described.

THOMAS ROBERTS.

Witnesses:
O. E. DOOLITTLE.
H. W. WILLIAMS.